United States Patent
Chan

(10) Patent No.: US 6,803,864 B2
(45) Date of Patent: Oct. 12, 2004

(54) METHOD OF ENTERING CHARACTERS WITH A KEYPAD AND USING PREVIOUS CHARACTERS TO DETERMINE THE ORDER OF CHARACTER CHOICE

(75) Inventor: Joseph C. Chan, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 712 days.

(21) Appl. No.: 09/861,247

(22) Filed: May 18, 2001

(65) Prior Publication Data

US 2002/0180621 A1 Dec. 5, 2002

(51) Int. Cl.[7] .............................................. H03M 13/00

(52) U.S. Cl. ...................... 341/22; 345/171; 345/156; 379/368

(58) Field of Search ..................... 341/28, 22; 345/171, 345/156; 379/368; 382/185

(56) References Cited

U.S. PATENT DOCUMENTS

| | | | |
|---|---|---|---|
| 4,427,848 A | 1/1984 | Tsakanikas | 179/2 |
| 4,677,659 A | 6/1987 | Dargan | 379/97 |
| 4,737,980 A | 4/1988 | Curtin et al. | 379/97 |
| 4,918,721 A | 4/1990 | Hashimoto | 379/96 |
| 5,559,512 A | 9/1996 | Jasinski et al. | 341/22 |
| 5,911,485 A | 6/1999 | Rossmann | 34/22 |
| 6,150,962 A | 11/2000 | Rossmann | 341/22 |
| 6,525,676 B2 * | 2/2003 | Kisaichi et al. | 341/22 |

* cited by examiner

*Primary Examiner*—Michael Horabik
*Assistant Examiner*—Hung Dang
(74) *Attorney, Agent, or Firm*—Miller Patent Services; Jerry A. Miller

(57) ABSTRACT

A method and apparatus for entering characters with a reduced number of key presses. The sequence of one or more previously entered characters is used to select a character assignment matrix. The order of characters in the assignment matrix is determined by the probability that the letter will be the next in the sequence, with more likely characters being presented first. Repeated key presses are used to access characters with lower probability.

21 Claims, 3 Drawing Sheets

| numeric key | 1 press | 2 presses | 3 presses | 4 presses |
|---|---|---|---|---|
| 2 | a | b | c | |
| 3 | d | e | f | |
| 4 | g | h | i | |
| 5 | j | k | l | |
| 6 | m | n | o | |
| 7 | p | q | r | s |
| 8 | t | u | v | |
| 9 | w | x | y | z |

*FIG. 2*

METHOD OF ENTERING CHARACTERS WITH A KEYPAD AND USING PREVIOUS CHARACTERS TO DETERMINE THE ORDER OF CHARACTER CHOICE

FIELD OF THE INVENTION

This invention relates generally to data entry using a keypad and in particular to the entry of text characters using a numeric keypad.

BACKGROUND OF THE INVENTION

Portable telephones, such as cellular and satellite telephones are increasingly being used for a variety of applications, such as internet access, electronic mail, text messaging, data storage and retrieval, electronic commerce etc. These applications require that textual information be entered by the user. Generally, handheld devices are too small to incorporate a full alpha-numeric keypad and instead have a numeric keypad together with a limited number of additional keys. It is common for the numbers 2–9 of the numeric keypad to be used to enter text. Since these eight keys must represent all 26 letters of the alphabet, each key has to represent several letters. For example, it is common for the numbers 2–6 and the number 8 to each represent 3 letters, while the number 7 and 9 each represent 4 letters.

A commonly used scheme is to press each key a specified number of times to select a letter. For example, the "2" key is used to represent the letters "a", "b" and "c". To enter the letter "a", the key is pressed once, to enter "b" the key is pressed twice and to enter "c" the key is pressed 3 times. The letter sequence "ba" and the letter "c" both require 3 key presses. In order to differentiate between these two cases, an additional key, usually referred to as the <enter> key must be pressed after each letter is selected, i.e. "ba" is entered as the key sequence "2", "2", <enter>, "2", <enter>. The letter "c" is entered as "2", "2", "2", <enter>.

If all letters were equally likely to be entered, an average of three keystrokes would be required for each letter. This is clearly a much less efficient way of entering text than using an alpha-numeric keyboard, which only requires a single keystroke to enter each letter.

In U.S. Pat. No. 6,150,962, an alternative scheme is described. Here, it is recognized that letters are not equally likely to be used. Some letters occur more often than others. In addition, the sequence of letters is not random. The probability of the next letter being an "a", for example, depends upon what letters have been entered previously. In U.S. Pat. No. 6,150,962 a look-up table is used to store the next most likely letter in a sequence. The table is indexed by the two prior letters entered. In this approach, the order of letters associated with a numeric key is not fixed. Rather, the first letter is determined by using the two previous letters to index the look-up table and determine the next most likely letter. This information must be passed to the user, so this approach requires that the device have a text display, so that the user can see which letter has been selected. The order of the remaining letters for each key is fixed and does not depend upon the prior letters. The device in U.S. Pat. No. 6,150,962 also uses a <rotate> key rather than an <enter> key. While this approach does, on average, reduce the number of key strokes required to enter text, it has several disadvantages. Firstly, the use of a <rotate> will not be familiar to most users, and secondly, the look-up table provides only the most probable letter. If this is not the correct letter, the next letter presented may be one with a very low probability. This feature reduces the efficiency of the method.

SUMMARY OF THE INVENTION

It is accordingly an object of the invention to be able to provide a method for entering text that reduces the number of key presses required, is reliable, and is easy to use.

BRIEF DESCRIPTION OF THE DRAWINGS

The novel features believed characteristic of the invention are set forth in the claims. The invention itself, however, as well as the preferred mode of use, and further objects and advantages thereof, will best be understood by reference to the following detailed description of an illustrative embodiment when read in conjunction with the accompanying drawing(s), wherein:

FIG. 2 is a table showing a character assignment for a standard telephone keypad.

DESCRIPTION OF THE INVENTION

Figure 1:
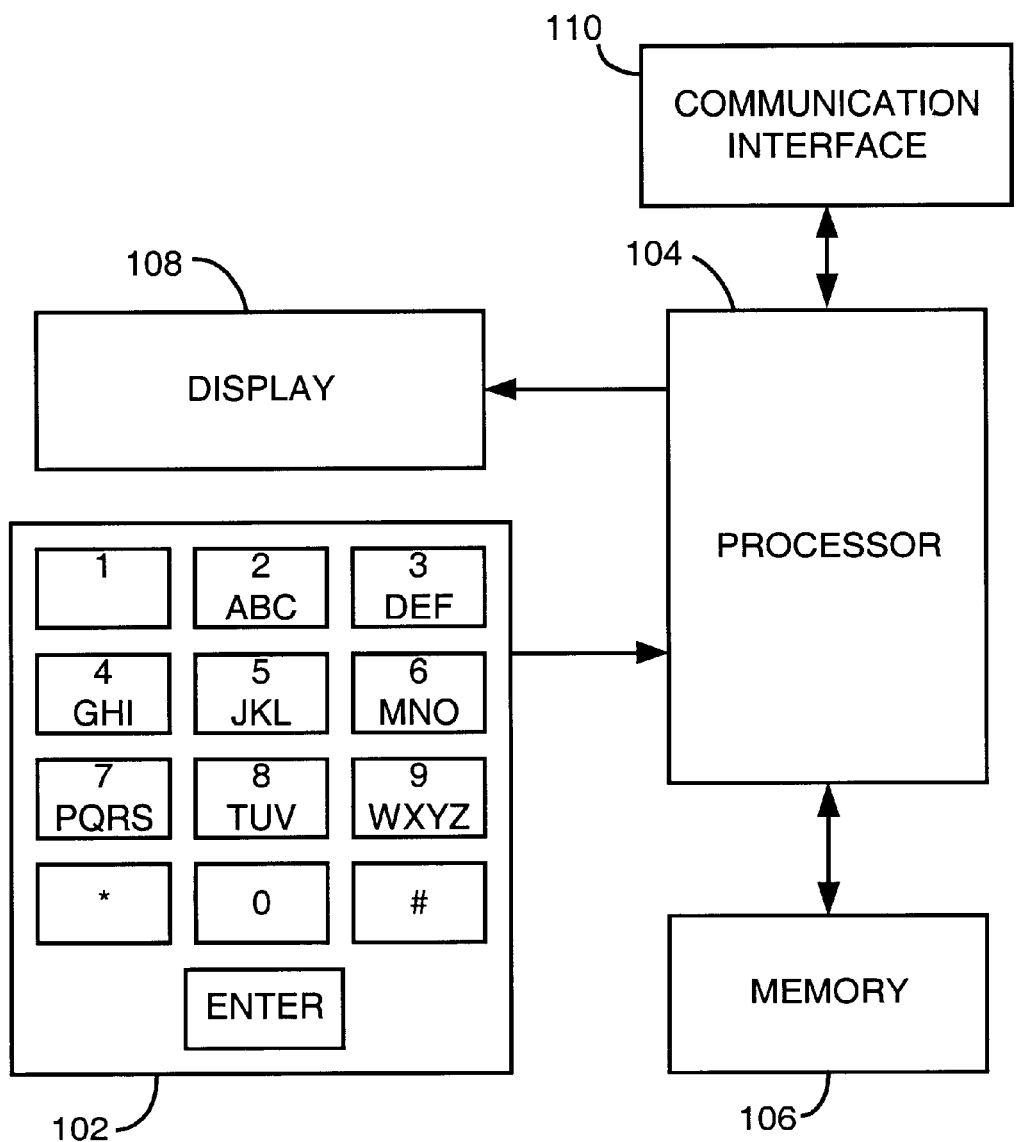
FIG. 1 is a simplified block diagram of the invention.

While this invention is susceptible of embodiment in many different forms, there is shown in the drawings and will herein be described in detail specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several Views of the drawings.

FIG. 1 shows a simplified block diagram of a system 100 of the present invention. A numeric keypad 102 includes numeric keys labeled "0" through "9". Also shown are additional keys "*" and "#" and a key labeled "ENTER". Other keys may be present on the keypad, depending upon the application of the device. Further, in some applications, the "*" and "#" keys may not be present. The additional keys may be combined so that, for example, the "#" key may also be used for an <enter> command. The keypad is connected to a processor 104, which in turn is connected to a memory 106, and a display 108. In some applications, the processor will also be connected with communications interface 110. The processor is configured to run software applications that require text input. Such applications include internet browsers, telephone text messaging, database access, etc. The processor 104 receives signals from the keypad 102 and calculates an index value into a look-up table stored in memory 106. The processor then retrieves the data indexed by the index value and, according to this data, the processor either causes a new character to be displayed on display 108 or uses the character currently displayed as an input. This process, together with the contents of the look-up table, will be described in more detail below. In one embodiment, the software application controls communication with a remote device that may be linked to the communication interface via a physical link such as an optical or electronic cable, or via a wireless link such as a radio or microwave channel.

In the preferred embodiment, the letters are assigned by an assignment matrix $\underline{\underline{M}}$ where the first (row) index is related to the key number assigned to that letter and the second (column) index corresponds to one of the letters assigned to the key number. For example, for a standard telephone key pad, the letter assignment is described by the table shown in FIG. 2.

This can be written compactly in matrix format as $$\underline{\underline{M}} = \begin{bmatrix} a & b & c \\ d & e & f \\ g & h & i \\ j & k & l \\ m & n & o \\ p & q & r & s \\ t & u & v \\ w & x & y & z \end{bmatrix}$$

The set of characters is a, b, ..., z. In one embodiment, each letter is assigned an index value, so that a=0, b=1, ..., z=25. The matrix corresponding to the standard telephone keypad is then $$\underline{\underline{M}} = \begin{bmatrix} 0 & 1 & 2 \\ 3 & 4 & 5 \\ 6 & 7 & 8 \\ 9 & 10 & 12 \\ 12 & 13 & 14 \\ 15 & 16 & 17 & 18 \\ 19 & 20 & 21 \\ 23 & 23 & 24 & 25 \end{bmatrix}$$

The matrix element from the row n and column m is denoted by M(n,m). For example, the index of the letter (3,1)=$\underline{\underline{M}}$(3,1)=10, which corresponds to the letter "j". Notice that indices start at zero, as is usual for computer applications.

In a further embodiment, letters are indexed by the order in which they appear on a key in the standard telephone keypad, so that a=0, b=1, c=2, d=0, ..., z=3. The assignment matrix corresponding to the standard telephone keypad is then $$\underline{\underline{D}} = \begin{bmatrix} 0 & 1 & 2 \\ 0 & 1 & 2 \\ 0 & 1 & 2 \\ 0 & 1 & 2 \\ 0 & 1 & 2 \\ 0 & 1 & 2 & 3 \\ 0 & 1 & 2 \\ 0 & 1 & 2 & 3 \end{bmatrix}$$

In general, a subset of the characters is assigned to each key. In this example, the subset {a,b,c} is assigned to "2", the subset {d,e,f} is assigned to "3", etc. The numbers correspond to the position of the character within the subset.

The matrix element from the row n and column m is denoted by D(n,m). The index of the letter associated with this element is $\underline{d}$(n)+D(n,m), where $\underline{d}$=[0 3 6 9 12 15 19 23 ].

For example, the index of the letter (3,1)=$\underline{d}$(3)+$\underline{\underline{D}}$(3,1)= 9+1=10, which corresponds to the letter "j".

One advantage of the assignment matrix $\underline{\underline{D}}$ is that it requires fewer bits (binary digits) to store each matrix. Only two bits are required per entry, whereas the matrix $\underline{\underline{M}}$ requires up to five bits per entry.

With these notations, any permutation of letters associated with the keypad numbers can be represented by a matrix $\underline{\underline{M}}$ or $\underline{\underline{D}}$. The matrices are look-up tables for the letter assignments.

According to one aspect of the present invention, the assignment of the letters to each numeric key is determined by the one or more prior letters entered from the keypad. As an example, the embodiment whether only the previous letter is used to determined the assignment is first described. An assignment matrix is stored in memory for each previous letter. This requires a total of 27 assignment matrices—one for each letter and one for "space". For example, if the previous letter was the letter "a", the assignment matrix might be $$\underline{\underline{D}}_a = \begin{bmatrix} 1 & 2 & 0 \\ 0 & 2 & 1 \\ 0 & 2 & 1 \\ 2 & 1 & 0 \\ 1 & 0 & 2 \\ 2 & 3 & 1 & 0 \\ 0 & 1 & 2 \\ 1 & 0 & 2 & 3 \end{bmatrix}.$$

The index of the letter associated with this element is $\underline{d}$(n)+D(n,m). Notice that only one copy of $\underline{d}$ must be stored.

The order of letters within the assignment matrix is determined by estimating the probability of each letter being the next in the sequence. The most likely letter for a given key is placed in the first column, the next most likely letter in the next column and so on. These probabilities may be estimated from sample text sequences associated with the appropriate application being run on the processor. For example, the assignment table for letter "a", the number of times each letter follows the letter "a" is counted. The letters which occur most often are taken as being the most likely.

In a further embodiment, the previous two letters are used to determine the next most likely letter. In this embodiment, an assignment table for each ordered pair of letters is stored in the memory. The total number of tables is then 27×27= 729. This is a more significant amount of memory, so the advantage of the using assignment matrices of the type $\underline{\underline{D}}$ is increased. In order to reduce the amount of memory required, rarely used letter pairs may all use the same assignment matrix. This matrix may be determined, for example, simply by the probability of each letter occurring without reference to any previous letters or with reference to the prior letter only.

Each letter is selected based upon the number of times a particular key is pressed before the <enter> key is pressed. For example, if the "2" key is pressed the letter indexed by the first matrix element $\underline{\underline{D}}$(0,0)is displayed on the display. If this is letter the user desires, he or she presses the <enter> key and the displayed letter is entered to the processor. If the displayed letter is not the desired letter, the user presses the "2" key again and the letter indexed by the next element D(0,1) is displayed on the display. If this is the desired letter, the user presses <enter> to cause it to be selected; otherwise successive key presses cause the next element in the matrix row to be displayed. If the displayed letter is the last in the row, the next key press will cause the first element to be displayed again, thereby allowing the user to return to a letter if they mistakenly press the number key rather than the <enter> key.

Figure 3:
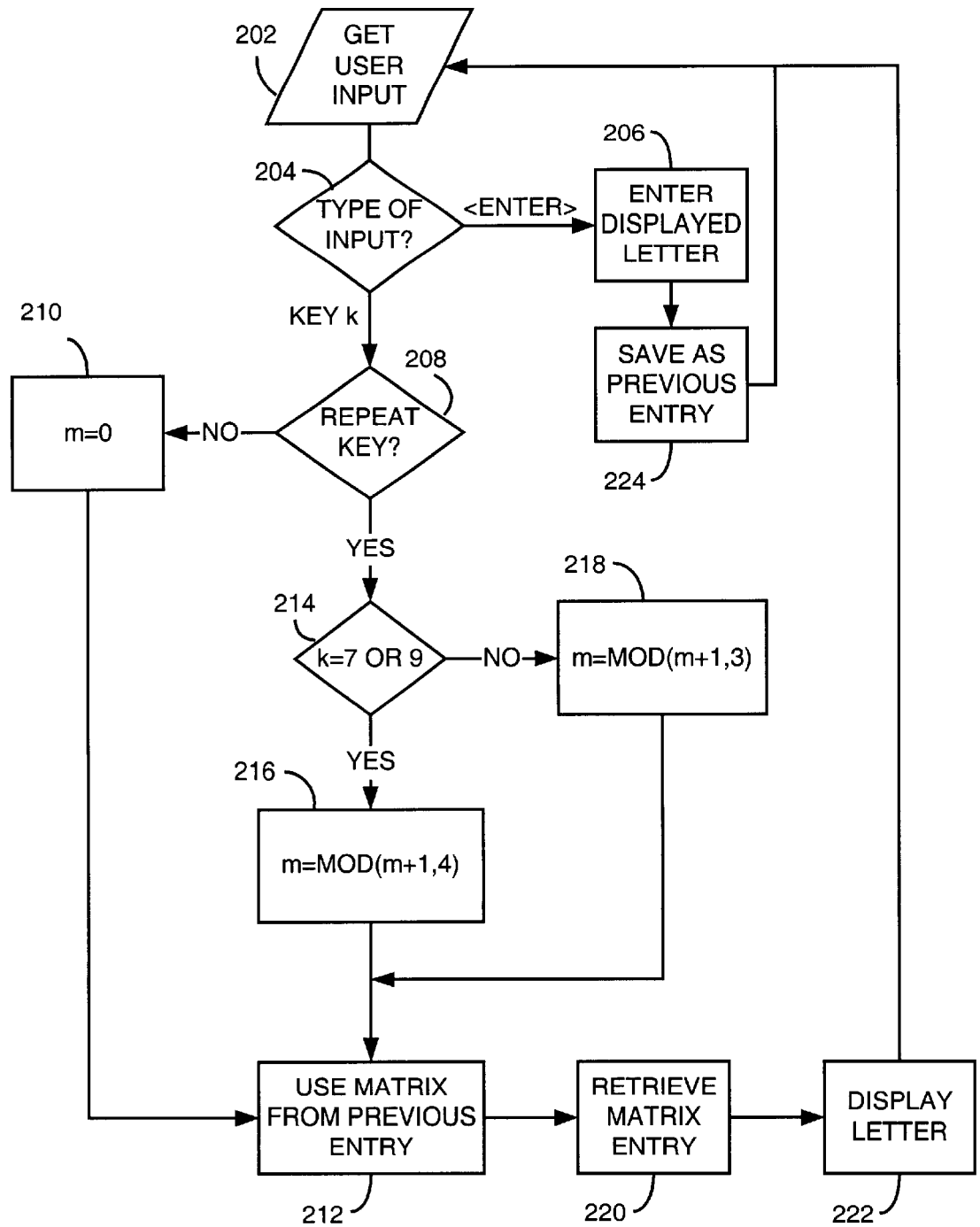
FIG. 3 is a flow chart illustrating the operation of one embodiment of the invention.

A flow chart depicting the operation of the processor in selecting a letter is shown in FIG. 3. The process is initiated at block 202 by a key press. At decision block 204 the type of input is determined. If the <enter> has been pressed, as depicted by the horizontal branch from decision block 204, the letter currently displayed on the display is entered. The displayed letter is then saved as the previous letter at block 224. Flow then returns to block 202. If no letter is displayed (not shown) flow returns to block 202. If the numeric key k has been pressed, as indicated by the vertical branch from decision block 204, the next step is to determine which matrix column index m to use. First, a check is made at decision block 208 to determine if this key has been pressed repeatedly. If not, as depicted by the negative branch from decision block 208, the matrix column index m is set to zero at block 210. If the key has been pressed before, as depicted by the positive branch from decision block 208, a further check is made at decision block 214 to determine if the key is a 7 or a 9. If it is a 7 or 9 the matrix column index m is incremented by one modulo 4 at block 216 (i.e. one is added to the index and then matrix column index m is replaced by the remainder after the index is divided by 4). if the key is neither a 7 nor a 9, the matrix column index m is incremented by one modulo 3 at block 218. Once the matrix column index m is determined, the assignment matrix associated with the previous letter is accessed at block 212. The matrix element D(k−2, m) is retrieved at block 220 and the letter is display$\bar{\text{e}}$d on the display at block 222. Flow then returns to block 202 pending another input from the user.

In this manner, the number of key strokes required to enter text will, on average, be reduced considerably.

The method may be extended to the case where n previous letters are used to determine the assignment matrix. This requires $27^n$ assignment matrices. As before, rarely used letter sequences may all use the same assignment matrix so as to reduce the amount of memory required.

While the invention has been particularly shown and described with reference to a preferred embodiment, it will be understood by those skilled in the art that various changes in form and detail may be made therein without departing from the spirit and scope of the invention. For instance, while the preferred embodiment shown and described above relates to entering text from a numeric keypad, it will be understood to those skilled in the art how the method could be applied to entering any set of characters or commands from a keypad with a restricted number of keys.

What is claimed is:

1. A method for entering a character from a set of characters in a device having a keypad with a plurality of keys and a display, said method comprising:

selecting a first index according to a received key input value;

selecting a second index according to the number of times the key input value has been sequentially entered;

selecting an assignment matrix, having a plurality of matrix elements, according to a sequence of previously entered characters;

retrieving a matrix element from said assignment matrix according to said first and second indices;

displaying a selected character corresponding to said matrix element on said display; and entering said selected character when a key specified as an enter key is activated, wherein the order of the plurality of matrix elements in said assignment matrix is determined by a probability that a corresponding character will be the next to be entered.

2. A method as in claim 1 in which the characters comprise the 26 letters a, b, . . . , z and the space character.

3. A method as in claim 1 in which each character in the set of characters is designated by a number and the plurality of matrix elements correspond to numbers assigned to each character.

4. A method as in claim 3 in which the letters a, b, . . . , z are designated by the values 0, 1, . . . , 25 and in which an assignment matrix is obtained by permutations of the elements of one or more rows of the matrix $$\underline{M} = \begin{bmatrix} 0 & 1 & 2 \\ 3 & 4 & 5 \\ 6 & 7 & 8 \\ 9 & 10 & 12 \\ 12 & 13 & 14 \\ 15 & 16 & 17 & 18 \\ 19 & 20 & 21 \\ 23 & 23 & 24 & 25 \end{bmatrix}.$$

5. A method as in claim 1 in which a subset of the characters in the set of characters is assigned to each key of the keypad and in which each character in the set of characters is designated by its position within the subset of characters.

6. A method as in claim 5 in which the subsets of characters comprise {a,b,c}, {d,e,f}, {g,h,i}, {j,k,l}, {m,n,o}, {p,q,r,s}, {t,u,v} and {w,x,y,z} and in which said assignment matrix is obtained by permutations of the plurality of matrix elements of one or more rows of the assignment matrix $$\underline{D} = \begin{bmatrix} 0 & 1 & 2 \\ 0 & 1 & 2 \\ 0 & 1 & 2 \\ 0 & 1 & 2 \\ 0 & 1 & 2 \\ 0 & 1 & 2 & 3 \\ 0 & 1 & 2 \\ 0 & 1 & 2 & 3 \end{bmatrix}.$$

7. A method as in claim 1 in which the assignment matrix is chosen in accordance with a previously entered character.

8. A method as in claim 1 in which the assignment matrix is chosen in accordance with two previously entered characters.

9. An apparatus for receiving a character from a set of characters, said apparatus comprising:

a keypad with a plurality of keys thereon;

a processor coupled to said keypad for receiving a signal in response to activation of a key of said plurality of keys;

a memory coupled to said processor for storing a plurality of character assignment matrices; and a display for displaying a selected character, wherein said processor selects a character assignment matrix from said plurality of character assignment matrices in accordance with a sequence of received characters, selects an element from said character assignment matrix in accordance with which key has been activated and how many times it has been activated, and determines said selected character in accordance with said element.

10. An apparatus as in claim 9 in which said plurality of keys includes an enter key and in which said selected character is a received character when said enter key is activated.

11. An apparatus as in claim 9 in which elements of a character assignment matrix of said plurality of character assignment matrices are determined in accordance with the probability of a character being next in said sequence of received characters.

12. An apparatus as in claim 9 further comprising:

a communications interface coupled to said processor and operable to transmit said received character, or one or more characters derived from it, to a remote location.

13. An apparatus as in claim 9 further comprising:

a counter operable to count the number of times the key has been activated.

14. An apparatus as in claim 13 wherein said counter is reset when a new key of the plurality of keys is activated.

15. An apparatus as in claim 13 wherein said counter is incremented when activation of the key is repeated.

16. An apparatus as in claim 13 wherein a plurality of predetermined values of said counter are used to index said character assignment matrix.

17. An apparatus as in claim 16 wherein said counter is reset if said counter is not equal to one of said plurality of predetermined values.

18. An apparatus as in claim 16 wherein said counter is reset if the activated key is 7 or 9 and said counter value is 4.

19. An apparatus as in claim 16 wherein said counter is reset if the activated key is neither 7 nor 9 and said counter value is 3.

20. A method for entering a character from a plurality of characters in a device having a keypad with a plurality of keys and a display, each key of the plurality of keys being associated with prescribed characters from said plurality of characters, said method comprising:

selecting a first index according to a received key input value in response an activated key from said plurality of keys;

setting a counter value to zero if said received key input value has not been repeated incrementing said counter value if said received key input value has been repeated;

setting said counter value to zero if said counter value is equal to the number of prescribed characters associated with said activated key from said plurality of keys.

selecting a second index according to said counter value;

selecting an assignment matrix, having a plurality of matrix elements, according to a sequence of previously entered characters;

retrieving a matrix element from said assignment matrix according to said first and second indices;

displaying a selected character corresponding to said matrix element on said display; and entering said selected character when a key specified as an enter key is activated, wherein the order of the plurality of matrix elements in said assignment matrix is determined by a probability that a character of the plurality of characters corresponding to the received key input value will be entered next.

21. A method as in claim 20 in which keys 2–9 of the plurality of keys are associated with prescribed characters {a,b,c}, {d,e,f}, {g,h,i}, {j,k,l}, {m,n,o}, {p,q,r,s}, {t,u,v} and {w,x,y,z}, respectively, and further comprising:

setting said counter value to zero if said received key input value is 7 or 9 and said counter value is 4;

setting said counter value to zero if said received key input value is neither 7 nor 9 and said counter value is 3.

* * * * *

UNITED STATES PATENT AND TRADEMARK OFFICE
CERTIFICATE OF CORRECTION

PATENT NO. : 6,803,864 B2
DATED : October 12, 2004
INVENTOR(S) : Chan

It is certified that error appears in the above-identified patent and that said Letters Patent is hereby corrected as shown below:

<u>Column 4,</u>
Line 28, the end of the first setence should read -- $\underline{d}(n) + \underline{D}_{=a}(n,m)$ --

Signed and Sealed this

Eighth Day of March, 2005

JON W. DUDAS
*Director of the United States Patent and Trademark Office*